No. 683,417. Patented Sept. 24, 1901.
J. WEINSTEIN.
CASE FOR EYEGLASSES OR SPECTACLES.
(Application filed May 6, 1901.)

(No Model.)

Witnesses:

Inventor:
Jacob Weinstein

UNITED STATES PATENT OFFICE.

JACOB WEINSTEIN, OF CHICAGO, ILLINOIS, ASSIGNOR TO ALMER COE, OF SAME PLACE.

CASE FOR EYEGLASSES OR SPECTACLES.

SPECIFICATION forming part of Letters Patent No. 683,417, dated September 24, 1901.

Application filed May 6, 1901. Serial No. 58,944. (No model.)

*To all whom it may concern:*

Be it known that I, JACOB WEINSTEIN, a citizen of the United States, residing at Chicago, in the county of Cook and State of Illinois, have invented certain new and useful Improvements in Cases for Eyeglasses or Spectacles, of which the following is a specification.

The present invention relates to a case in which two pairs of eyeglasses or two pairs of spectacles or one pair of eyeglasses and one pair of spectacles may be carried; and its object is to so construct the case that its size will be reduced to a minimum.

To this end I construct the case of two similar sections hinged together, and I provide each of these sections with a pocket or other device for receiving a pair of glasses, the pocket of one section being at the side adjacent to the hinge, while the pocket of the other section is at the side remote from the hinge, and it is in this, broadly stated, that the invention resides.

Figure 1:
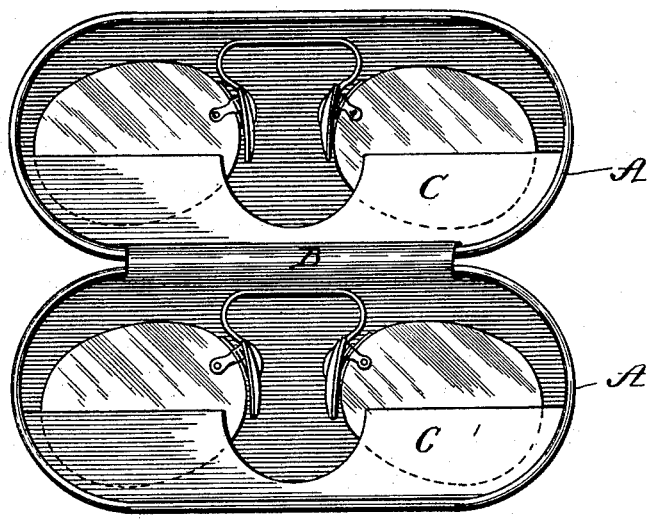
Figure 2:
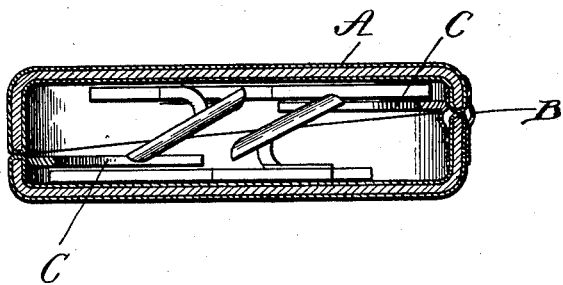

In the accompanying drawings, which are a part of this specification, Figure 1 is a plan view of a case embodying the invention, the case being shown open and with two pairs of eyeglasses in place therein. Fig. 2 is a transverse section thereof.

The case comprises two similar sections A, hinged together at B and each having a pocket or other device C for receiving and holding a pair of eyeglasses or spectacles. The pocket of one section of the case is located at the side adjacent to the hinge, while the pocket of the other section is located at the side remote from the hinge, so that the bridges of two pairs of spectacles (or the guards of two pairs of eyeglasses) when in place therein will fall upon opposite sides of the central line of the case.

The walls of each section of the case are graduated in height, being shallower at the pocket side than at the opposite side, so that in the above-described arrangement of the pockets the high wall of one section is hinged to the low wall of the other section. The object of this is to make each section a complete carrier for a pair of glasses, with walls at all points only as high as need be, and at the same time have a case of symmetrical shape when closed.

Having thus described my invention, what I claim as new therein, and desire to secure by Letters Patent, is—

1. A case for glasses comprising two sections hinged together, each of said sections having means for holding a pair of glasses, the said means of one section being located at the side thereof adjacent to the hinge and the said means of the other section being located at the side thereof remote from the hinge, substantially as described.

2. A case for glasses comprising two sections hinged together, each of said sections having means for holding a pair of glasses, the said means of one section being located at the side thereof adjacent to the hinge and the said means of the other section being located at the side thereof remote from the hinge, the walls of each section being graduated in height, the lower wall of one section and the higher wall of the other section being located at the hinge, substantially as described.

3. A case for glasses comprising two sections hinged together, each of said sections having at one side a pocket for holding a pair of glasses, the pocket of one section being located at the side adjacent to the hinge and the pocket of the other section being located at the side remote from the hinge, substantially as described.

JACOB WEINSTEIN.

Witnesses:
 L. M. HOPKINS,
 ALMER COE.